Dec. 10, 1968  V. BENATAR ETAL  3,415,354
FEEDER MECHANISM
Filed Feb. 25, 1966  3 Sheets-Sheet 1
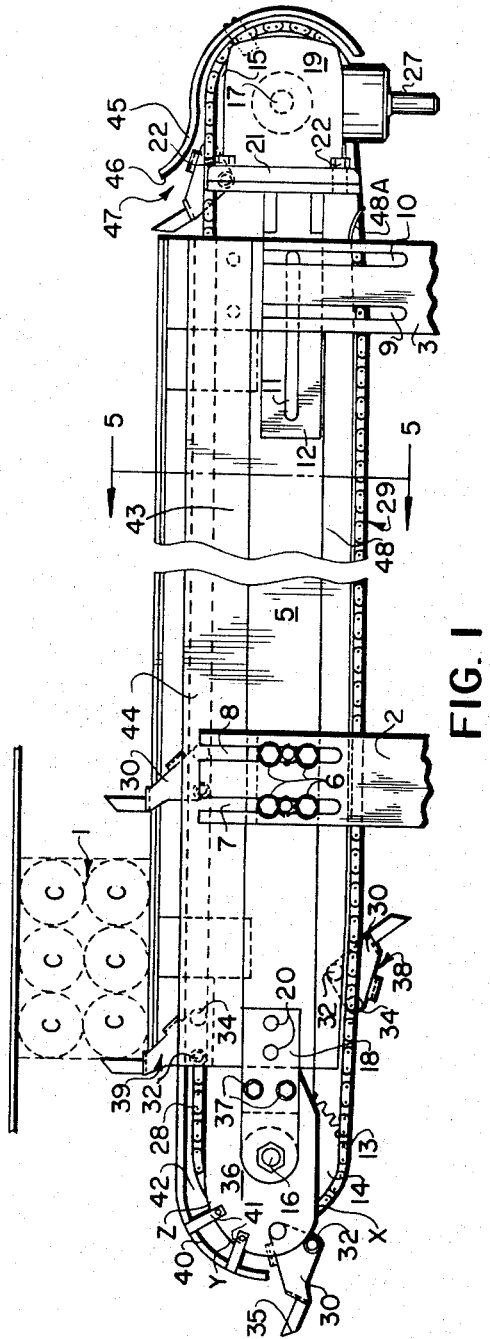
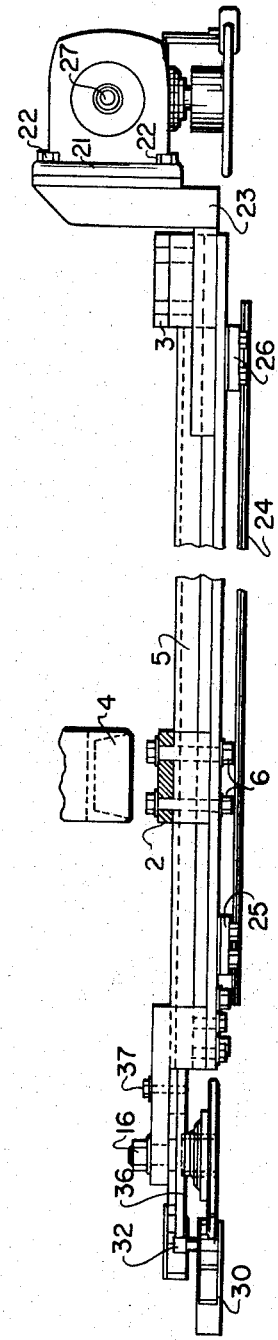
INVENTOR.
VICTOR BENATAR
BY  RICHARD T. WILCOX
Walter M. Rodgers
ATTORNEY Dec. 10, 1968    V. BENATAR ETAL    3,415,354
FEEDER MECHANISM
Filed Feb. 25, 1966    3 Sheets-Sheet 2
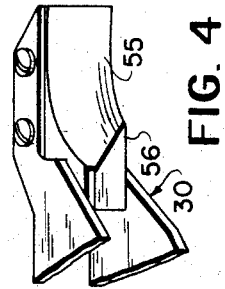
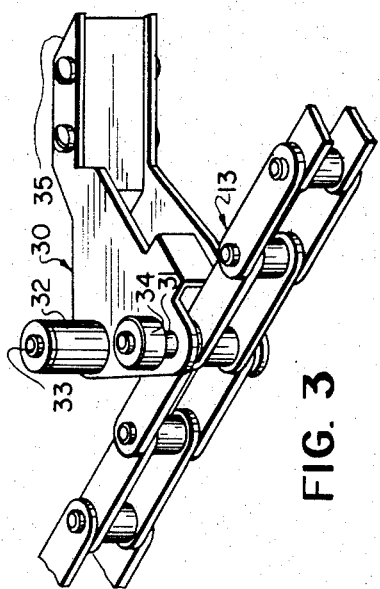
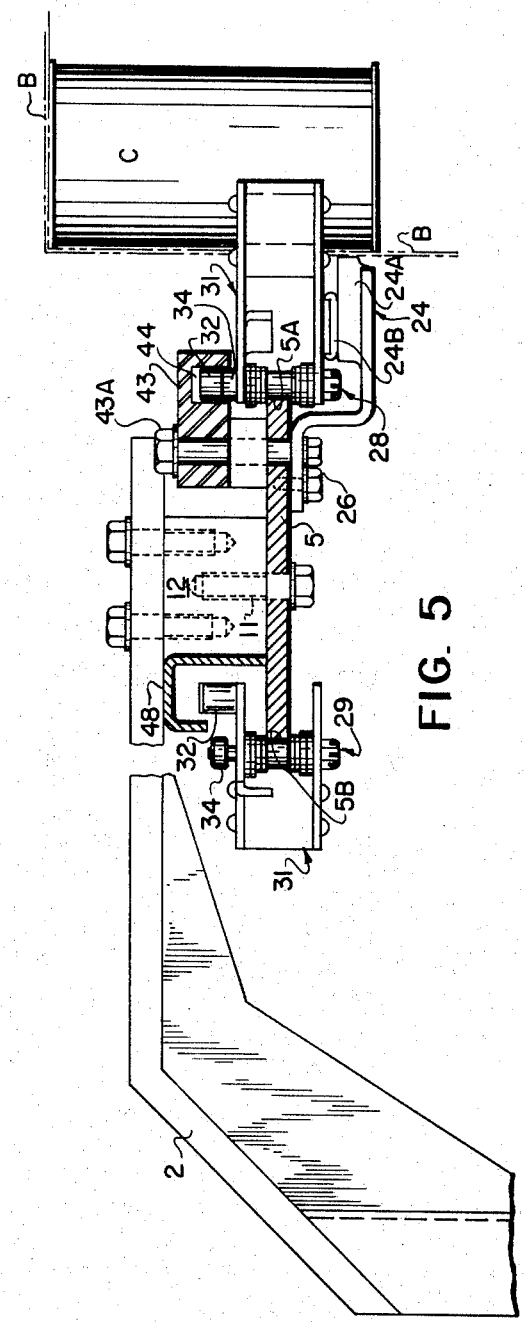
INVENTOR.
VICTOR BENATAR
BY  RICHARD T. WILCOX
Walter M. Rodgers
ATTORNEY

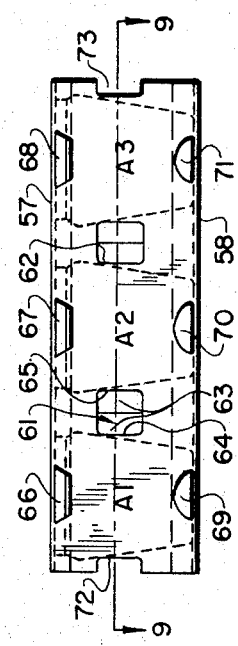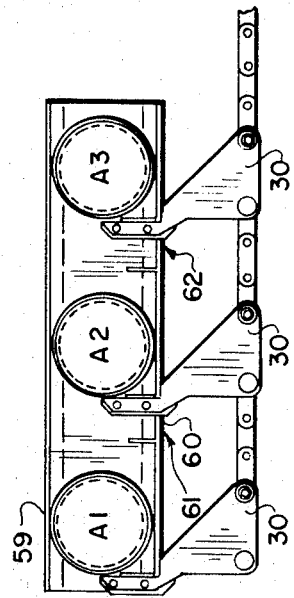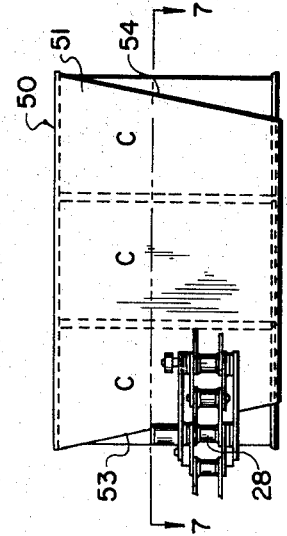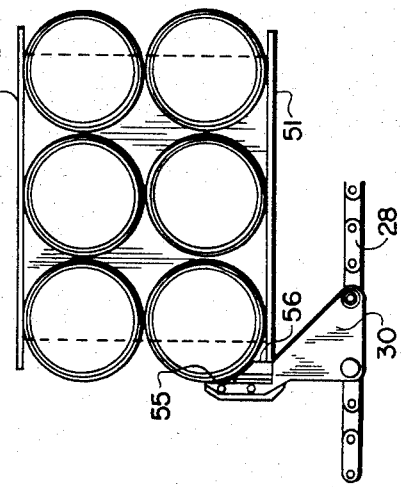

United States Patent Office 3,415,354
Patented Dec. 10, 1968

3,415,354
FEEDER MECHANISM
Victor Benatar, Atlanta, and Richard T. Wilcox, Clarkston, Ga., assignors to The Mead Corporation, a corporation of Ohio
Filed Feb. 25, 1966, Ser. No. 530,150
2 Claims. (Cl. 198—173)

ABSTRACT OF THE DISCLOSURE

For feeding articles along a predetermined path and in a predetermined spaced relationship to each other, an endless conveyor is arranged with its working reach alongside and parallel to the path of movement of the articles. A plurality of feeder lugs mounted in spaced relationship to each other on the conveyor are arranged to move in behind and to import movement to predetermined articles. The conveyor is mounted at its ends on rotatable elements and each lug is provided with a cam follower for engaging a cam at the entry end of the conveyor. The cam is constructed at the initially engaged portion thereof with a curvature of shorter radius than a subsequently engaged portion. The subsequently engaged portion of the cam is of generally parabolic configuration and is arranged relative to the periphery of the rotatable element so as to impart oscillatory movement to each lug as it approaches the path of movement of the articles.

---

This invention relates to a feeder mechanism and more particularly to a feeder conveyor for use in conjunction with a high speed packaging machine of the type utilized to package a plurality of primary packages in a single open-ended sleeve-type wrapper.

High speed packaging machines ordinarily are arranged so that the packaging operation is performed while the articles to be packaged and their wrappers are moved continuously in individual groups. Thus, it is necessary to provide means for separating the various groups of articles and for imparting continuous movement thereto. One known arrangement for this purpose utilizes a pair of endless chains disposed on opposite sides respectively of the path of movement of the articles to be packaged together with transversely disposed pusher bars sometimes called "flight" bars secured at the ends thereof to the continuous chains. While such an arrangement is satisfactory for many applications of high speed packaging machines and has met with substantial commercial acceptance, such a mechanism requires precise timing and positioning of the so-called "flight bars" in order to avoid undesired collision of the machine parts with the articles to be packaged because the return reach normally is disposed below the path of movement of the articles to be packaged and the "flight bars" must therefore ride up and between the groups of articles to be packaged. Where the packaged articles are fragile, it is customary to provide space therebetween so as to prevent collision and breakage of adjacent articles. Such spacing poses difficult machine problems because of possible interference by the wrapper. Furthermore, when the wrapper blank is constructed with irregular edges, additional problems may result.

A principal object of this invention is to provide an improved feeder mechanism for a high speed multiple packaging machine wherein a high degree of adaptability for various packaging conditions is possible and wherein maximum simplicity is achieved.

Another object of this invention is the provision of an improved feeder mechanism for high speed packaging machines wherein the mechanism serves not only to impart the desired movement to the groups of articles to be packaged but wherein the mechanism also serves automatically to establish the proper space between adjacent groups of a series of groups which are moved one behind the other.

Still another object of this invention is to provide an improved arrangement for a feeder mechanism wherein the entire mechanism is disposed alongside of rather than underneath the path of movement of the groups of articles so as to minimize the necessity for synchronizing the various motions of the machine and of the conveyor mechanism.

A further object of the invention is the provision of an improved feeder mechanism which is adapted to impart movement to groups of articles and also which is effective to space the articles of a group from each other in the direction of travel thereof.

A still further object of the invention is to provide an improved lug for a feeder mechanism wherein the lug is adapted to correlate the movement of the articles to be packaged with a wrapper therefor which has irregular edge configurations along the ends of the wrapper.

The invention in one form as applied to a mechanism for spacing a plurality of groups of articles moving in series one behind the other and for advancing the groups along a predetermined path may comprise a continuous feeder conveyor mounted on rotatable elements and having a feeder reach arranged in generally parallel relation to the path of movement of the group of articles, a plurality of feeder lugs pivotally mounted on said conveyor and arranged to protrude between adjacent groups, a cam follower on each lug and a fixed cam disposed at the entry of the feeder reach of the conveyor, said cam being sequentially engageable by said cam followers and being configured to impart initial rotation to the lugs and thereafter to impart transverse bodily movement thereto relative to the path of movement of the groups of articles. In addition, the cam causes the lugs to rotate in a manner such that the outer tips of the lugs travel at the same speed as the articles during transverse movement of the lugs.

According to one feature of the invention, a stabilizing guide is disposed in parallel relation to the path of movement of the groups of articles and a stabilizing follower element is mounted on each of said lugs and is arranged to engage said stabilizing guide so as to maintain a predetermined orientation of the lug relative to the groups of articles.

In accordance with another feature of the invention, rotation of the lugs is achieved primarily due to the configuration of the cam wherein the initially engaged portion thereof is constructed with a relatively short radius of curvature and wherein the subsequently engaged portion is constructed with a longer radius of curvature and generally of a parabolic configuration whereby each lug is initially rotated about its pivotal mounting and thereafter is moved in a transverse direction relative to the path of movement of the groups of articles.

According to another feature of the invention an ejector guide is disposed at the withdrawal end of the feeder reach of the conveyor and is arranged to engage and impart rotary movement of the lugs in sequence and thereby to free the groups of articles from the lugs and from the remaining parts of the feeder apparatus.

By another facet of the invention, the outer extremity of each lug is of a bevelled configuration so as to avoid collision between the outer end of the lug and the trailing one of a pair of groups of articles between which the lug is interposed while performing a spacing and feeding operation.

One inherent capability of the feeder mechanism of the invention allows the device to space articles of a single group from each other by allowing the lugs to protrude through openings in the wrapper side wall and one improved lug of the invention correlates movement of an article group and of a wrapper therefor which is irregularly configured.

For a better understanding of the invention, reference may be had to the following detailed description taken in conjunction with the accompanying drawings in which FIG. 1 is a plan view of a feeder mechanism constructed according to the invention; FIG. 2 is a front view of the arrangement depicted in FIG. 1; FIG. 3 is a perspective view of a conveyor chain on which a plurality of feeder lugs are mounted and which shows a single lug in a random relation to the chain; FIG. 4 is a perspective view of a modified lug; FIG. 5 is a cross sectional view taken along line 5—5 in FIG. 1; FIG. 6 is a side view of a group of articles and their wrapper together with the modified lug of FIG. 4; FIG. 7 is a view from above and taken along the line 7—7 in FIG. 6; FIG. 8 is a side view of a wrapper for which the feeder is effective to space articles therein from each other; and in which FIG. 9 is a view of FIG. 8 from above and taken on the section line designated 9—9 in FIG. 8.

For simplicity FIG. 1 shows the portion of the feeder conveyor system which is disposed on only one side of a packaging machine, it being understood that a similar arrangement preferably is disposed on the opposite side thereof and cooperates with the opposite conveyor to impart the desired spacing and movement to the groups of articles along the path of movement thereof.

In FIG. 1 the numeral 1 generally designates a group of articles individually designated by the letter C which are fed through a portion of the packaging machine by the mechanism of this invention. The feeder mechanism is supported from the main frame of the packaging machine by a pair of transversely disposed support arms 2 and 3 which are affixed at their outer extremities to the frame of the packaging machine in cantilevered fashion, support element 2 being shown broken at its mid-portion with the outer extremity 4 thereof depicted as being secured to the frame of the packaging machine. Affixed to the transverse support arms 2 and 3 is a base plate generally designated by the numeral 5, the base plate being secured to support arm 2 by means of bolts 6 which are disposed in slots 7 and 8 formed in transverse arm 2. Of course, slots 7 and 8 accommodate sidewise adjustment of base plate 5 and associated apparatus relative to transverse support arms 2 and 3. In like fashion, a pair of slots 9 and 10 are formed in transverse support arm 3 and receive suitable fastening bolts not shown in FIG. 1. Slot 11 formed in plate 12 affixed by any suitable means such as by welding to base plate 5 serves to accommodate lengthwise dimensional discrepancies.

For the purpose of movably supporting the feeder conveyor which is depicted as an endless chain designated by the numeral 13, a pair of sprocket wheels 14 and 15 are mounted respectively at the ends of the base plate 5 and are rotatably supported on shafts 16 and 17 which in turn are supported by plates 18 and 19. Plate 18 is affixed to base plate 5 by a pair of bolts 20 while plate 19 is provided with a flange 21 which is secured by bolts 22 to end plate 23 secured by suitable means to the base plate 5. Preferably, a supporting and guide element 24 is secured by suitable means 25 and 26 to the extremities of the base plate 5 and associated structure so as to support the lugs 30 and for guiding the blanks along the feeder reach thereof.

Rotation is imparted to feeder conveyor 13 by motive means coupled with shaft 27 which in turn is connected by a gear mechanism with the shaft 17 and the sprocket 15. As viewed in FIG. 1, the feeder reach designated by the numeral 29 of course moves from right to left.

As explained, movement is imparted to the groups such as 1 by lugs pivotally mounted on the feeder conveyor 13. One lug is shown in FIG. 3 and designated by the numeral 30. As is apparent in FIG. 3, lug 30 is pivotally mounted at pin 31 for rotation bodily thereabout. The lug 30 is provided with a first cam follower element 32 rotatably mounted on fixed pin 33 together with a stabilizing element 34 mounted on pin 31 or an extension thereof. The outer extremity of lug 30 is bevelled as indicated at 35 for a purpose which will be explained.

The lug 30 as described above cooperates with a fixed cam designated by the numeral 36 and secured in position by means of a pair of bolts 37 which extend through holes in the support plate 18. As is apparent from FIG. 1, the left hand end of cam 36 is provided with a special configuration whereby desired swinging and transverse bodily movement is imparted to the lugs 30 in a sequential fashion.

Since the outwardly extending extremity of each lug 30 serves as a spacer between the groups 1 and may also space the items C from each other, and since the space between one group and an immediately following group normally is small, it is necessary to provide means whereby the feeder lugs 30 move in a transverse bodily direction by a wedging action thereby to enter the space between adjacent groups of packages 1 without rotating about pin 31. Stated otherwise, if the lugs were allowed to swing into the position depicted immediately behind the illustrated group 1, the swinging motion would rupture or otherwise damage the wrapper and the primary packages immediately behind the group illustrated.

In order to swing the lugs from the position which they occupy on the return reach 29 of the feeder conveyor 13, the cam 36 is provided with an initially engaged portion which is constructed with a relatively short radius of curvature. Thus, the part of the cam 36 which extends approximately from the point designated "X" to the point designated "Y" is constructed with a relatively short radius of curvature and the feeder conveyor 13 is spaced therefrom in such a way that the lugs 30 are rotated approximately 180 degrees from the position depicted at 38 to that depicted on the feeder reach of the conveyor at 39.

Since the desired motion of the lugs when entering the space between adjacent groups of articles is in a transverse direction and generally normal to the path of movement of groups of articles, the portion of the cam 36 between point "Y" and point "Z" is generally of a parabolic configuration and simply causes transverse bodily movement of the lugs while rotating the lugs about their pivots 31 clockwise or forward and then counterclockwise in a reverse direction for a brief interval. This oscillation is to insure that the tip 35 of each lug travels at the same speed as the articles "C" even though the linear travel of the conveyor from point "Y" to point "Z" is less than the corresponding linear travel of the articles "C" due to the curvature of the cam from "Y" to "Z." Stated otherwise, each increment of movement of the conveyor from "Y" to "Z" has a component in the direction of the feeder reach of the conveyor as well as a component in a transverse direction. Thus, the travel from left to right of a lug from "Z" to "Y" is not sufficient to equal the speed of articles "C." Thus, the lugs are oscillated from "Y" to "Z" to compensate therefor for one cycle. Since the portion 35 of each lug is bevelled, the tendency for the lug to engage or otherwise to interfere with a following package is minimized.

For the purpose of securing the lugs 30 into close contact with the cam 36, a suitable guide 40 is secured by brackets 41 to the cam 36 and establishes a passageway 42 in which the rollers 32 are caused to ride.

In order to insure stability of the lugs 30 as they travel along the feeder reach of the feeder conveyor 13, a stabilizing guide 43 is affixed to the base plate 5 by bolts 43A and extends throughout the major portion of the feeder reach of conveyor 13. Guide 43 is provided with a trough or groove 44 in which the stabilizing follower element 33 is disposed and which also receives the cam follower element 32. The two followers 32 and 34 thus afford a substantial guided base which effectively holds the lugs 30 in a transverse relationship to the base plate 5 and to the path of movement of the groups of articles designated by the numeral 1.

Upon completion of the feeding operation performed by this invention, it is necessary to withdraw the lugs such as 30 from their spacing and feeding relationship to the article groups 1. To this end an ejector guide 45 is affixed to the plate 19 and is provided with a bumper surface 46 which engages the lugs and imparts rotation thereto about their pivots 31 as is depicted at 47 in FIG. 1.

As is best shown in FIG. 5, the feeder reach 28 of the conveyor 13 is supported against outward sidewise movement by the guiding edge 5A of the base plate 5 and the weight of the lugs 31 is supported in part by the slide plate 24B secured to metal guide 24A. The left hand edge of guide 24A positions the side wall of the carton blank B and the slide plate 24B preferably is made of low friction plastic and supports the lugs 30.

The return reach 29 of the conveyor is supported against sidewise movement in both directions. For example, the guiding edge 5B of the base plate 5 secures the return reach of the conveyor against movement inwardly while the trough-type guide 48, secured as by welding or otherwise to the support plate 12 and to the arms 2 and 3, forms a passageway between which the cam follower 32 is captured. By the elements just described, the continuous conveyor is controlled in position against undue sidewise movement at all times.

In order to handle carton blanks of the wrap-around type such as are best shown in FIGS. 6 and 7, a special lug as depicted in FIG. 4 is provided according to one facet of this invention. With reference to FIG. 6, a package generally designated at 50 is shown wherein the side walls 51 and 52 are specially configured with angularly disposed end edges 53 and 54. The special configuration of end edges 53 and 54 is such that a lug such as is shown in FIG. 3 would not ordinarily engage the edge such as 53 of the wrapper 51 when the lug is in engagement with the adjacent article "C." Thus, in order to insure that the lug 30 will engage both the article as well as the end edge 53, a special configuration is provided as is shown in FIG. 4 and comprises an article engaging surface 55 and a wrapper edge engaging surface designated by the numeral 56. Thus, by the lug of FIG. 4, the carton side walls 51 and 52 are movable simultaneously and in unison with the articles "C" so as to insure a proper relationship therebetween as the package is formed and completed.

Since the motion of the lugs 30 inwardly at the entry end of the feeder reach of the conveyor as well as outwardly at the exit end of the feeder reach of the conveyor is in a transverse direction, it is possible to use the feeder mechanism of this invention as a means for spacing individual articles lengthwise within a wrapper. Of course, ordinarily such spacing is desired due to the fact that the articles to be packaged are fragile in nature and collision between adjacent articles must be avoided.

In FIGS. 8 and 9 a single line package is shown wherein three fragile articles designated A1, A2 and A3 are shown with space therebetween. These articles are disposed within a wrapper having top wall 57, bottom wall 58 and a pair of side walls 59 and 60. Provided in side wall 60 are suitable windows or apertures generally designated at 61 and 62. If desired, these apertures could be provided with hingedly mounted doors such as are designated at opening 61 by the numeral 63. Of course, it will be understood that one panel 63 preferably is hingedly mounted at fold line 64 while the other panel 63 preferably is hingedly mounted at fold line 65. As is best shown in FIG. 9, lugs 30 may be arranged so as to enter the openings 61 and 62, or if the panel elements 63 are used the lugs 30 simply swing the panels 63 inwardly along the fold lines 64 and 65 so that suitable space is provided between articles A1 and A2 on the one hand and between articles A2 and A3 on the other hand. Of course, the articles are maintained in spaced condition by known means such for example as the corner slots designated in the drawings by the numerals 66–71.

If desired, the end wall such as end walls 59 and 60 may be provided at their ends with recesses such as are shown at 72 and 73 in FIG. 8. These recesses of course allow lugs such as 31 to engage the end edge of the wrapper and at the same time to come into secure contact with the adjacent article such as A1. The slot 73 on the other hand simply affords a space to facilitate the entry of one of the lugs 31 between a pair of adjacent packages such as are shown in FIGS. 8 and 9.

From the description above, it is apparent that by this invention a feeder conveyor system is provided which is not only characterized by a high degree of simplicity and reliability but which also performs the dual function of spacing a pair of adjacent groups of articles arranged in following relation one behind the other and of feeding the groups individually throughout a portion of a packaging operation.

While a particular embodiment of the invention has been shown and described, the invention is not limited thereto and it is intended in the appended claims to cover all such changes and modifications as fall within the true spirit and scope of the invention.

The embodiments of the invention in which an exclusive property or privilege is claimed are defined as follows:

1. A feeder mechanism for spacing in a predetermined fashion a plurality of articles moving in series, one behind the other, and for advancing the articles along a predetermined substantially straight path, said machine comprising a continuous feeder conveyor having a feeder reach extending between a pair of rotatable elements and arranged in generally parallel relation to the path of movement of the articles, a plurality of feeder lugs pivotally mounted in spaced relation on said conveyor, said lugs being spaced apart by a distance which is a multiple of the lateral dimension of the articles plus the lateral dimension of at least one lug and being arranged to protrude between adjacent articles, a cam follower on each of said lugs, and a cam disposed at the entry end of the feeder reach of said conveyor, said cam being sequentially engageable by said cam followers and being configured so that the initially engaged portion thereof is of shorter radius of curvature than the subsequently engaged portion thereof and the subsequently engaged portion thereof being of generally parabolic configuration and said cam being disposed with respect to the adjacent one of said rotatable elements and to the path of movement of the articles in such a relation that the outer tips of said lugs are oscillated first in a forward direction and then in a reverse direction for a brief interval so as to synchronize the movement of the lugs into a space between adjacent articles while the articles move at a speed determined by the linear speed of the conveyor.

2. A mechanism according to claim 1 wherein a lug is associated with and disposed immediately behind each article for spacing each article from the succeeding article in the direction of movement of the articles.

References Cited

UNITED STATES PATENTS

| | | | |
|---|---|---|---|
| 737,269 | 9/1903 | Park | 198—171 X |
| 2,623,746 | 12/1952 | Gegenheimer et al. | 198—170 X |
| 3,085,377 | 4/1963 | Ganz | 53—48 X |
| 3,190,434 | 6/1965 | Dardaine | 53—48 X |
| 3,225,510 | 12/1965 | Jones et al. | 53—48 |

TRAVIS S. McGEHEE, *Primary Examiner.*

E. F. DESMOND, *Assistant Examiner.*